(12) United States Patent
Miller et al.

(10) Patent No.: US 8,607,689 B2
(45) Date of Patent: Dec. 17, 2013

(54) SEAL MEMBER FOR A HYDRAULIC BRAKING SYSTEM

(75) Inventors: Roger Miller, Edwardsburg, MI (US); Milan Klimes, Nlles, MI (US); Brian Edward Roach, Osceola, IN (US)

(73) Assignee: Robert Bosch GmbH, Stuttgart (DE)

( * ) Notice: Subject to any disclaimer, the term of this patent is extended or adjusted under 35 U.S.C. 154(b) by 816 days.

(21) Appl. No.: 12/815,524

(22) Filed: Jun. 15, 2010
(Under 37 CFR 1.47)

(65) Prior Publication Data
US 2011/0302916 A1    Dec. 15, 2011

(51) Int. Cl.
    *F16J 9/00*    (2006.01)
(52) U.S. Cl.
    USPC .............. 92/243; 60/588; 92/245; 92/249; 92/254
(58) Field of Classification Search
    USPC ........ 92/168, 169.1, 254, 249, 248, 241, 240, 92/242, 243, 244, 245, 246; 277/564, 569, 277/584, 438, 567; 60/588
    See application file for complete search history.

(56) References Cited

U.S. PATENT DOCUMENTS

| | | | |
|---|---|---|---|
| 2,349,170 A * | 5/1944 | Jackman | 277/488 |
| 3,563,558 A | 2/1971 | Doutt | |
| 4,061,346 A | 12/1977 | Coleman et al. | |
| 4,280,741 A * | 7/1981 | Stoll | 384/16 |
| 4,592,558 A | 6/1986 | Hopkins | |
| 4,627,332 A | 12/1986 | Furuta et al. | |
| 4,781,024 A | 11/1988 | Nakamura | |
| 4,850,601 A | 7/1989 | Maier et al. | |
| 5,328,178 A * | 7/1994 | Nies | 277/438 |
| 6,272,858 B1 | 8/2001 | Takano et al. | |
| 6,928,815 B2 | 8/2005 | Ishida | |
| 6,957,605 B1 * | 10/2005 | Blume | 92/240 |
| 6,993,907 B2 | 2/2006 | Cooney | |
| 7,520,132 B2 | 4/2009 | Chiba | |

FOREIGN PATENT DOCUMENTS

| | | |
|---|---|---|
| DE | 19755772 A1 | 6/1999 |
| DE | 102007056651 A1 | 5/2009 |
| GB | 1554989 A | 10/1979 |
| JP | 9136639 A | 5/1997 |

OTHER PUBLICATIONS

International Search Report and Written Opinion in corresponding PCT application (i.e., PCT/US2011/040298), mailed Oct. 21, 2011 (9 pages).

* cited by examiner

*Primary Examiner* — Edward Look
*Assistant Examiner* — Logan Kraft
(74) *Attorney, Agent, or Firm* — Maginot, Moore & Beck

(57) ABSTRACT

A sealing member for a piston slidably disposed within the cylinder bore of a hydraulic system includes a seal body having an outer sealing surface arranged to contact the cylinder bore and a glide ring at least partially disposed within the outer sealing surface of the seal body. The glide ring includes an outer surface and the outer sealing surface of the seal body includes at least one seal lip projecting beyond the outer surface of the glide ring.

17 Claims, 1 Drawing Sheet

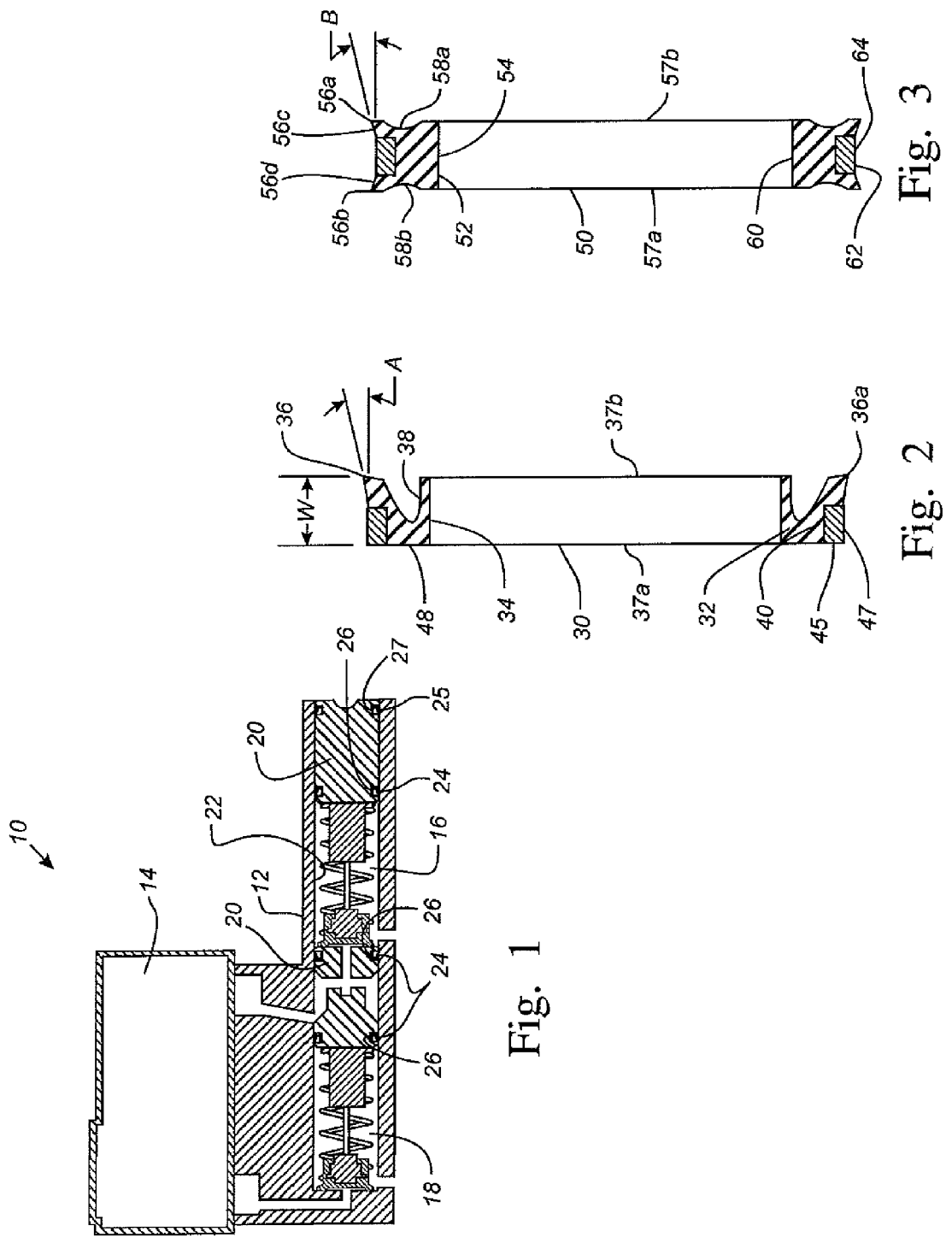

SEAL MEMBER FOR A HYDRAULIC BRAKING SYSTEM

BACKGROUND

The present disclosure relates to hydraulic control systems, and especially to seal members and seal assemblies used in a master cylinder of a hydraulic braking system.

Conventionally, a master cylinder for developing fluid pressure according to pedal force applied by a brake or clutch pedal is used in a hydraulic brake or clutch system for the purpose of actuating a brake or a clutch. A typical master cylinder for a hydraulic braking system 10, as generally depicted in FIG. 1, comprises a master cylinder 12 fed by a brake fluid reservoir 14. The master cylinder includes a primary cylinder body 16 and a secondary cylinder body 18 in communication through a common cylinder bore 22. A primary piston 20 is slidably disposed within the cylinder bore 22.

The master cylinder includes sealing members between the cylinder bore 22 and the primary piston 20 (as well as the secondary piston disposed in the secondary cylinder body 18). In some master cylinders, the sealing members are mounted within the cylinder body, with the pistons traversing an inner surface of the sealing members. One such exemplary seal configuration is shown in U.S. Pat. No. 7,520,132, assigned to Bosch Corporation, which issued on Apr. 21, 2009, the disclosure of which is incorporated herein by reference.

In another seal configuration, the primary piston 20 includes a number of sealing members 24, 25 received in corresponding grooves 26, 27 formed in the body of the piston, as depicted in FIG. 1. In this configuration, the sealing members 24, 25 move with the piston within the cylinder bore 22. The seal configuration includes a glide ring formed of TEFLON®.

In a hydraulic control system, and especially in a braking system, it is essential to maintain the pressures within the master cylinder and to avoid leakage around the piston(s) in the system. At the same time, the pistons must be capable of relatively free sliding within the cylinder bore to ensure suitable responsiveness of the hydraulic system and to maintain an appropriate activation pressure, particularly for an automotive braking system. There is always a need for a sealing arrangement that is capable of proper sealing at low and high pressures without introducing unnecessary drag to the sliding action of the pistons within the hydraulic cylinder.

SUMMARY

In one embodiment, a hydraulic system comprises a fluid cylinder in communication with a source of hydraulic fluid and defining a cylinder bore, a piston slidably disposed within the cylinder bore, said piston including a piston body defining at least one annular groove opening toward said cylinder bore, and a sealing member disposed within at least one annular groove. In one feature, the sealing member including a seal body having an outer sealing surface arranged to contact the cylinder bore and a glide ring at least partially disposed within the outer sealing surface of the seal body.

In one feature, the glide ring includes an outer surface facing the cylinder bore and the outer sealing surface of the seal body includes at least one seal lip projecting beyond the outer surface of the glide ring. In certain embodiments, the outer sealing surface of the seal body includes two seal lips projecting beyond the outer surface of the glide ring with the glide ring disposed within the seal body between the seal lips.

In a further feature, the seal body includes opposite annular faces and defines a notch between the outer sealing surface and one of the annular faces.

In another aspect, the glide ring is formed of a different material than the seal body. The seal body may be formed of a resilient elastomeric material, while the glide ring is formed of a low sliding friction material which will improve the overall efficiency of the master cylinder.

According to another feature, the circumferential sealing surface of the seal body at the seal lip(s) is angled outward relative to the seal body. The seal body may further define a relief portion radially inward from the seal lip(s) to operate as a hinge for deflection of the seal lip(s).

The seal member disclosed herein is less sensitive to wear than traditional seals for hydraulic systems. The configuration of the seal body improves leakage performance relative to standard glide ring arrangements in hydraulic pistons.

DESCRIPTION OF THE FIGURES

FIG. 1 is a general diagram of a hydraulic braking system.

FIG. 2 is a cross-sectional view of a sealing member according to the present disclosure.

FIG. 3 is a cross-sectional view of another sealing member according to the present disclosure.

DETAILED DESCRIPTION

The present disclosure relates to a sealing member mounted within a sliding piston, such as the primary piston 20 of the hydraulic braking system 10. In particular, the sealing member disclosed herein can be mounted within the annular grooves 26, 27 in the piston 20 or similar recesses in other pistons within the system 10.

Referring to FIG. 2, a sealing member 30 according to one embodiment includes a seal body 32 having an inner circumferential surface 34 adapted to seat within an annular groove 26, 27. The seal body 32 preferably has a width W sized for a correct fit within the annular groove 26, 27. The seal body 32 defines a circumferential seal lip 36 at the rear face 37b of the body. The seal lip 36 projects outward at an angle A. The angle A is sufficient so that the seal lip 36 essentially exceeds the inner diameter of the bore 22 of the master cylinder 12. When the seal member 30 is mounted within the piston 20 and introduced into the master cylinder bore 22, the seal lip 36 deflects inward so that the outer sealing surface 36a of the seal lip rides in sealing engagement with the inner bore 22.

In order to facilitate the inward deflection of the seal lip 36, the seal body 32 is formed of a resilient material. In addition, the seal body defines a circumferential relief or cup portion 38 radially inward from the seal lip. This relief portion 38 thus acts to allow the body behind the relief portion to hinge and allow the seal lip 36 to deflect. The seal lip 36 may also exhibit a tapering thickness from the relief portion to the rear face 37b.

In one aspect, the outer sealing surface 36a of the seal lip may incorporate micro-grooves (not shown) to help reduce the sliding friction between the sealing member 30 and body of the master cylinder 12. The microgrooves may extend circumferentially around the seal in multiple rows spaced along a portion of the width of the seal body. The microgrooves are preferably no more than 0.1" deep in the sealing surface. Alternatively, the sealing surface may be provided with micro-ridges projecting outward from the surface and arranged in several circumferential rows along the width of the seal body.

In a further feature, the sealing member 30 defines a circumferential notch or groove 40 at the outer surface of the seal body. The groove 40 may also intersect the front annular face 37a of the seal body, as illustrated in FIG. 2. A glide ring 45 is positioned within the groove 40. The glide ring 45 is formed of a relatively less resilient material compared to the seal body 32, and most preferably of a material with a low sliding friction characteristic. Thus, in one embodiment the glide ring is formed of TEFLON® or DELRIN®, or other similar plastic or resin-based materials, provided the materials exhibit suitable friction characteristics and are not susceptible to degradation when contacted by the hydraulic fluids within the braking system 10 or other hydraulic system. The glide ring 45 has an outer circumferential surface 47 that is at least co-extensive with the outer surface of the seal body at the groove 40, but preferably projecting slightly above the groove 40 in the seal body. The outer surface 47 is preferably sized for a close running fit within the cylinder bore 22. This fit may be an interference or clearance fit in the installed condition. As shown in FIG. 2, the glide ring 45 is a substantially solid annular ring, with the groove having a complementary shape. Alternatively the glide ring 45 may incorporate features on its inner diameter 48 to enhance engagement of the glide ring with the seal body 32. The glide ring 45 has a width that is approximately half the width W of the seal body 32. In the illustrated embodiment, the glide ring overlaps an innermost extent of the relief portion 38. However, the relief portion is configured to ensure suitable thickness of the seal body between the circumferential groove 40 and the relief portion 38.

In one embodiment, the glide ring 45 may be affixed to the seal body 32 in a conventional manner, such as with the use of an epoxy or similar adhesive. Alternatively, the seal body 32 may be over-molded onto the glide ring 45 according to known procedures. In another embodiment, the glide ring may be essentially press-fit onto the seal body, which can be sufficient when the seal member is disposed within the annular groove of the piston body. The glide ring may be installed onto the seal body after the seal body is installed in the piston groove 26, 27, and then sized to fit into the groove 40 of the seal body.

In certain applications, such as within a braking system 10, multiple seal members 30 are provided along the length of a particular piston, provided it has sufficient length to accommodate multiple seals. Thus, as shown in FIG. 1, the primary piston 20 incorporates seals at the opposite ends of the piston. The seal members 30 may be mounted within the annular grooves 26, 27 at each end in a predetermined orientation to provide the best fluid seal possible. Most particularly, the seal members 30 are oriented with the relief portion 38 of the seal body facing the higher pressure end of the piston. In the configuration shown in FIG. 1, the seal members in the three locations 26 would be oriented with the rear annular face 37b of the seal body facing toward the opening between the fluid reservoir 14 and the master cylinder 12 (i.e., to the left in the figure). With this orientation, any pressurized fluid entering the relief portion 38 will tend to deflect the seal lip 36 outward to provide a tighter fluid seal against the cylinder bore 22. The seal member 25 in the location 27 is not exposed to any pressurized fluid, therefore it may be oriented in either direction.

The seal member 50 shown in FIG. 3 can be assembled within the piston in any orientation—i.e., it is assembly direction independent. The seal member 50 includes a seal body 52 with an inner circumferential surface 54 adapted to seat within an annular groove 26, 27. The seal body defines two circumferential seal lips 56a, 56b at the opposite annular faces 57a, 57b of the seal body 52. Each seal lip 56a, 56b includes a corresponding sealing surface 56c, 56d that is oriented at an angle B. The angle B may be similar to the angle A of the seal member 30. The sealing surfaces 56c, 56d of the seal 50 may incorporate the micro-grooves or micro-ridges described above for the surface 36a of the seal 30.

The seal body 52 defines a relief portion 58a, 58b radially inward from each corresponding seal lip 56a, 56b. These relief portions are shallower than the relief portion 38 of the seal member 30, in part because the seal lips 56a, 56b do not extend across as much of the seal width as the seal lip 36, and in part to avoid interference with the groove 60 in the center of the seal body 52.

As indicated above, the seal body 52 defines a circumferential groove 60 in the center portion of the body. A glide ring 62 is disposed within that groove, so that the glide ring is flanked by the two seal lips 56a, 56b. The glide ring 62 may be constructed similar to the glide ring 45 and thus may be formed of a low sliding friction material, such as a plastic or resin, as described above. The outer circumferential surface 64 of the glide ring 60 has a diameter that is less than the outer diameter of the seal lips 56a, 56b, but still sized for a close running fit within the bore 22. The outer circumferential surface 64 that is at least co-extensive with the outer surface of the seal body at the groove 60, but preferably projecting slightly above the groove 60 in the seal body.

As can be appreciated from FIG. 3, the seal member 50 can be mounted on the piston in either orientation since the faces 57a, 57b of the piston body 52 are identical and the glide ring 62 is centrally within the seal body. Since both faces 57a, 57b include a relief portion 58a, 58b, high pressure from either side of the seal member will tend to push the corresponding seal lip 56a, 56b outward into a greater sealing contact with the cylinder bore 22.

The glide ring 62 may be suitably mounted and retained within the circumferential groove 60. Thus, in certain embodiments, the glide ring may be adhered or press-fit within the groove. Also the glide ring may be installed after the seal is in the piston groove, 26, 27. Alternatively, the seal body may be over-molded onto the glide ring in a conventional manner.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

For instance, in certain embodiments, the relative dimensions of the seal body and glide ring may be different than disclosed herein. While a single glide ring is shown in each of the disclosed embodiments, more than one glide ring may be incorporated into appropriately defined circumferential grooves in the seal body.

What is claimed is:
1. A hydraulic braking system comprising:
a fluid cylinder in communication with a source of hydraulic fluid and defining a cylinder bore;
a piston slidably disposed within said cylinder bore, said piston including a piston body having an outer surface and defining at least one annular groove opening toward said cylinder bore, said annular groove defining a first side wall and a second side wall both of which terminate at said piston body outer surface, and a base wall disposed between said first side wall and said second side wall; and a sealing member disposed within said at least one annular groove, said sealing member including a seal body having an outer sealing surface arranged to contact said cylinder bore and a glide ring at least partially disposed within said outer sealing surface of said seal body, said glide ring including a first side in contact with said seal body and a second side spaced from said first side, wherein said seal body defines a relief portion disposed radially inward from said first side wall, said first side wall extending across the entire relief portion and defining an unobstructed space between said relief portion and said first side wall, said unobstructed space configured to receive a fluid.

2. The hydraulic braking system of claim 1, wherein:
said glide ring includes an outer surface facing said cylinder bore; and
said outer sealing surface of said seal body includes at least one seal lip projecting beyond said outer surface of said glide ring, said at least one seal lip further including a first side surface adjacent said relief portion and in contact with said first side wall.

3. The hydraulic braking system of claim 2, wherein said outer sealing surface of said seal body includes two seal lips projecting beyond said outer surface of said glide ring with said glide ring disposed within said seal body between said seal lips, wherein one of said two seal lips includes said first side surface and the other of said two seal lips includes a second side surface in contact with said second side wall.

4. The hydraulic braking system of claim 2, wherein:
said seal body includes opposite annular faces and defines a notch between said outer sealing surface and one of said annular faces; and
said glide ring is disposed within said notch.

5. The hydraulic braking system of claim 1, wherein said glide ring is formed of a different material than said seal body.

6. The hydraulic braking system of claim 5, wherein said seal body is formed of a resiliently deformable material.

7. The hydraulic braking system of claim 5, wherein said glide ring is formed of a low sliding friction material.

8. The hydraulic braking system of claim 1, wherein said outer sealing surface includes a plurality of micro-grooves or micro-ridges formed therein.

9. The hydraulic braking system of claim 1, wherein said relief portion is a generally U-shaped recess.

10. The hydraulic braking system of claim 9, wherein said relief portion extends at least one half the width of said seal body.

11. The hydraulic braking system of claim 1, wherein said seal body is over-molded about said glide ring.

12. The hydraulic braking system of claim 1, wherein said outer sealing surface of said seal body includes a pair of resiliently deflectable seal lips and a center portion between said seal lips, said center portion defining a groove for receiving said glide ring.

13. The hydraulic braking system of claim 12, wherein said outer sealing surface at said seal lips is angled outward relative to the seal body.

14. A sealing member for a piston slidably disposed within the cylinder bore of a hydraulic system, the piston including an annular groove defining a first side wall, a second side wall and a base wall disposed between said first side wall and said second side wall, said sealing member comprising:
a seal body having an outer sealing surface arranged to contact said cylinder bore; and
a glide ring including an outer glide ring surface, said glide ring at least partially disposed within said outer sealing surface of said seal body, wherein said outer sealing surface of said seal body includes at least one seal lip projecting beyond said outer glide ring surface, a first side surface adjacent said seal lip configured to contact said first side wall, and a relief portion disposed radially inward from said first side surface, the relief portion configured to define an unobstructed space between said relief portion and said first side wall, said unobstructed space configured to receive a fluid.

15. The seal member of claim 14, wherein said outer sealing surface of said seal body includes two seal lips projecting beyond said outer glide ring surface with said glide ring disposed within said seal body between said seal lips.

16. The seal member of claim 14, wherein:
said seal body includes opposite annular faces and defines a notch between said outer sealing surface and one of said annular faces; and
said glide ring is disposed within said notch.

17. The seal member of claim 14, wherein said glide ring is formed of a different material than said seal body.

\* \* \* \* \*